(12) United States Patent
Nakai

(10) Patent No.: US 11,584,217 B2
(45) Date of Patent: Feb. 21, 2023

(54) VEHICLE BODY FRONT STRUCTURE

(71) Applicant: Honda Motor Co., Ltd., Tokyo (JP)

(72) Inventor: Yusuke Nakai, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/412,184

(22) Filed: Aug. 25, 2021

(65) Prior Publication Data

US 2022/0063396 A1 Mar. 3, 2022

(30) Foreign Application Priority Data

Sep. 3, 2020 (JP) .............................. JP2020-148308

(51) Int. Cl.
*B60K 11/08* (2006.01)
*F01P 7/02* (2006.01)
*B60K 11/06* (2006.01)

(52) U.S. Cl.
CPC .............. *B60K 11/08* (2013.01); *B60K 11/06* (2013.01); *F01P 7/02* (2013.01)

(58) Field of Classification Search
CPC ....... B60K 11/08; B60K 11/06; B60K 11/085; B60K 11/04; B60R 19/52; B60R 2019/525; F01P 7/02
See application file for complete search history.

(56) References Cited

U.S. PATENT DOCUMENTS

| 8,631,889 | B2 | 1/2014 | Begleiter et al. | |
| 2012/0318476 | A1* | 12/2012 | Begleiter | B60T 5/00 |
| | | | | 165/51 |
| 2012/0323448 | A1* | 12/2012 | Charnesky | F01P 7/04 |
| | | | | 454/145 |
| 2016/0129805 | A1* | 5/2016 | Garfinkel | B60L 58/27 |
| | | | | 180/68.5 |

FOREIGN PATENT DOCUMENTS

| CN | 103889756 | 6/2014 |
| JP | H0761247 | 3/1995 |
| JP | 2007038838 | 2/2007 |
| JP | 2010208482 | 9/2010 |
| JP | 2012126297 | 7/2012 |
| JP | 2015145221 | 8/2015 |
| JP | 2015174528 | 10/2015 |
| JP | 2016078766 | 5/2016 |
| JP | 2018094948 | 6/2018 |

OTHER PUBLICATIONS

"Office Action of China Counterpart Application" with English translation thereof, dated Dec. 2, 2022, p. 1-p. 13.

* cited by examiner

*Primary Examiner* — Jacob M Amick
(74) *Attorney, Agent, or Firm* — JCIPRNET

(57) ABSTRACT

A vehicle body front structure (10) includes: a shutter mechanism (19), an under cover (20), and a cooling duct (21). The shutter mechanism includes an upper shutter (54) and a lower shutter (55). The under cover covers a power device, a cooling device, and a peripheral component from below. Air is sent from the lower shutter to the cooling duct, and the cooling duct includes: an intake port portion (75), a first discharge port portion (91), and a second discharge port portion (98). Air is sent from the lower shutter to the intake port portion. The first discharge port portion and the second discharge port portion are positioned at the back of a vehicle body of the power device, and send air toward the peripheral component.

14 Claims, 8 Drawing Sheets

VEHICLE BODY FRONT STRUCTURE

CROSS-REFERENCE TO RELATED APPLICATION

This application claims the priority benefits of Japanese application no. 2020-148308, filed on Sep. 3, 2020. The entirety of the above-mentioned patent application is hereby incorporated by reference herein and made a part of this specification.

BACKGROUND

Technical Field

The disclosure relates to a vehicle body front structure.

Related Art

As the vehicle body front structure, a structure is known which is configured in a way that a shutter device is arranged at the front of a vehicle body, and the shutter device is controlled to be opened/closed, thereby sending air to components to be cooled (for example, a brake component and a radiator of a power device) arranged closer to the back of the vehicle body than the shutter device.

According to the shutter device, the shutter is controlled to be closed when the radiator and the brake component are not required to be cooled. Thereby, air resistance can be reduced during the travel of the vehicle and fuel efficiency can be improved (for example, see Patent literature 1).

LITERATURE OF RELATED ART

Patent Literature

[Patent literature 1] U.S. Pat. No. 8,631,889 Specification

Incidentally, in order to further improve the fuel efficiency of the vehicle body front structure, it is required to increase the sealing degree of a power device storage room (for example, an engine room) for storing the power device, and further suppress the inflow of outside air to the power device storage room.

However, when the sealing degree of the power device storage room is increased, it is difficult to efficiently cool peripheral components disposed behind the power device (engine), for example, a rubber part of a suspension arm, a rubber part that seals a steering device, and the like, and the cost is increased as the heat resistance of heat-resistant rubber or the like is improved.

The disclosure provides a vehicle body front structure which can improve fuel efficiency and efficiently cool the peripheral components disposed behind the power device (engine).

SUMMARY

A vehicle body front structure according to the disclosure includes: a shutter mechanism (for example, a shutter mechanism 19 of an embodiment) which includes an upper shutter (for example, an upper shutter 54 of the embodiment) that sends air to a cooling device (for example, a cooling device 16 of the embodiment) for cooling a power device (for example, a power device 14 of the embodiment), and a lower shutter (for example, a lower shutter 55 of the embodiment) that is arranged below the upper shutter and sends air to a peripheral component (for example, a peripheral component 45 of the embodiment) arranged at the back of the vehicle body of the cooling device; an under cover (for example, an under cover 20 of the embodiment) which covers the power device, the cooling device, and the peripheral component from below; a cooling duct (for example, a cooling duct 21 of the embodiment) which is arranged along the under cover and to which air is sent from the lower shutter. The cooling duct includes: an intake port portion (for example, an intake port portion 75 of the embodiment) which is communicated to the lower shutter and to which air is sent from the lower shutter; and a discharge port portion (for example, a first discharge port portion 91 and a second discharge port portion 98 of the embodiment) which is positioned at the back of the vehicle body of the power device in a state of being communicated to the intake port portion, and sends air toward the peripheral component.

DESCRIPTION OF THE EMBODIMENTS

Figure 1:
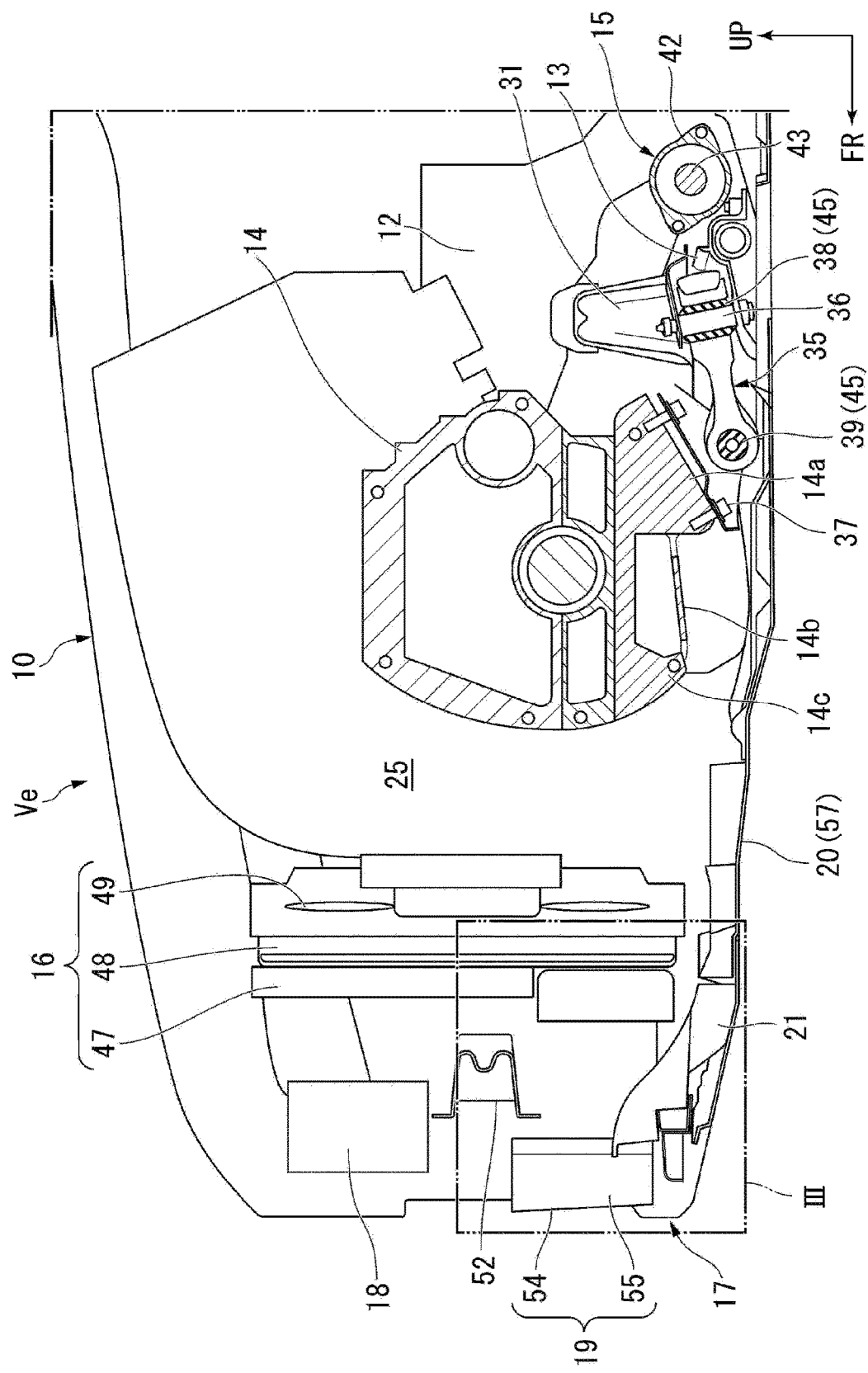
FIG. 1 is a cross-sectional view showing a vehicle body front structure of one embodiment according to the disclosure.

Hereinafter, a vehicle body front structure according to one embodiment of the disclosure is described with reference to the drawings. In the drawings, an arrow FR indicates the front of a vehicle, an arrow UP indicates the upper side of the vehicle, and an arrow LH indicates the left-hand side of the vehicle.

<Vehicle Body Front Structure>

Figure 2:
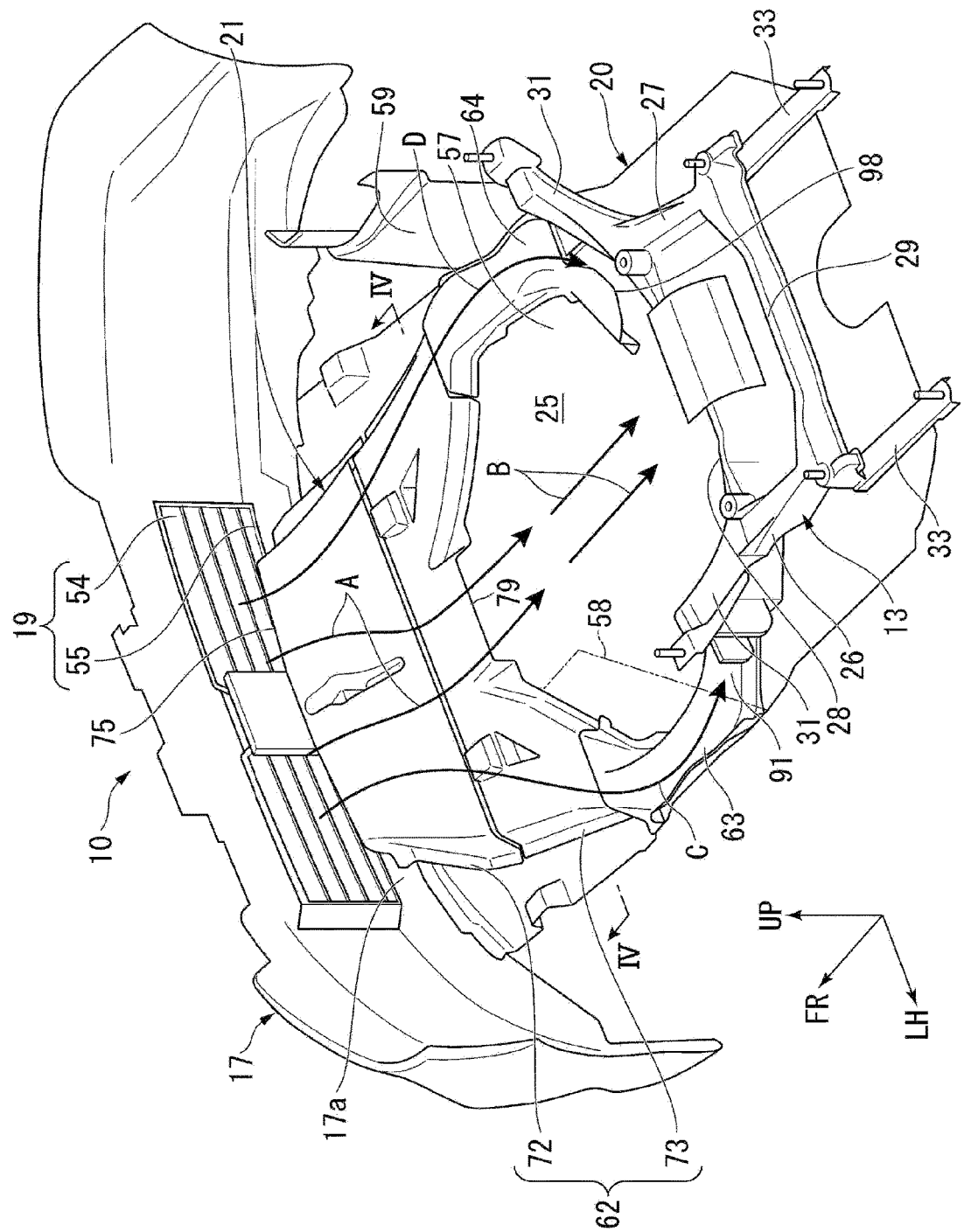
FIG. 2 is a perspective view showing the vehicle body front structure of one embodiment.

As shown in FIG. 1 and FIG. 2, a vehicle Ve includes, for example, a vehicle body front structure 10 that constitutes a front portion of the vehicle Ve. The vehicle body front structure 10 includes: left and right front side frames 12 (only the one on the right side is shown), a subframe 13, a power device 14, a steering device 15, a cooling device 16, a front bumper face 17, an upper step grille shutter 18, a lower step grille shutter 19, an under cover (engine under cover) 20, and a cooling duct 21.

Here, the subframe 13, the power device 14, the steering device 15, the cooling device 16, and the cooling duct 21 are disposed in a power device storage room (for example, an engine room) 25 that accommodates the power device 14.

The left and right front side frames 12 are members that are arranged on both the left and right sides in a vehicle width direction and constitute the framework of the vehicle body front structure 10. The subframe 13 is arranged below the left and right front side frames 12.

For example, the subframe 13 is formed in a rectangular frame shape by a left side frame 26, a right side frame 27, a front member 28, and a rear member 29. Front end portions at the left and right of the left side frame 26 and the right side frame 27 are respectively attached to the left and right front side frames 12 via support members 31 from below. In addition, back end portions of the left side frame 26 and the right side frame 27 are respectively attached to back end portions of the left and right front side frames 12.

To the back end portions of the left side frame 26 and the right side frame 27, front end portions of left and right floor frames 33 are respectively attached from below. The left and right floor frames 33 are disposed at intervals in the vehicle width direction and extend toward the back of a vehicle body.

<Power Device and Peripheral Component>

The power device 14 is arranged at the front of the vehicle body of the subframe 13. The power device 14 is, for example, an engine, or a component to be cooled which is obtained in a way that an engine and a transmission are integrally assembled. In the embodiment, the engine is illustrated as the power device 14, but the power device 14 is not limited hereto. With regard to the power device 14, for example, upper side portions at the left and right are supported in a rubber-mounted state by the left and right front side frames 12.

Furthermore, with regard to the power device 14, a back lower portion 14a is supported by a central portion of the subframe 13 in the vehicle width direction via a support rod (tie rod) 35.

Specifically, a back side engagement portion 36 is arranged on the subframe 13, and a front side engagement portion 37 is arranged on the back lower portion 14a of the power device 14. A back end portion of the support rod 35 is connected to the back side engagement portion 36 via a back mount rubber 38 having a cylindrical shape. In addition, a front end portion of the support rod 35 is connected to the front side engagement portion 37 via a front mount rubber 39 having a cylindrical shape.

That is, the power device 14 is supported by the left and right front side frames 12 and the subframe 13 in a rubber-mounted state. Thereby, vibration transmitted from the power device 14 to the vehicle body (particularly, the vehicle body front structure 10) can be attenuated.

Figure 3:
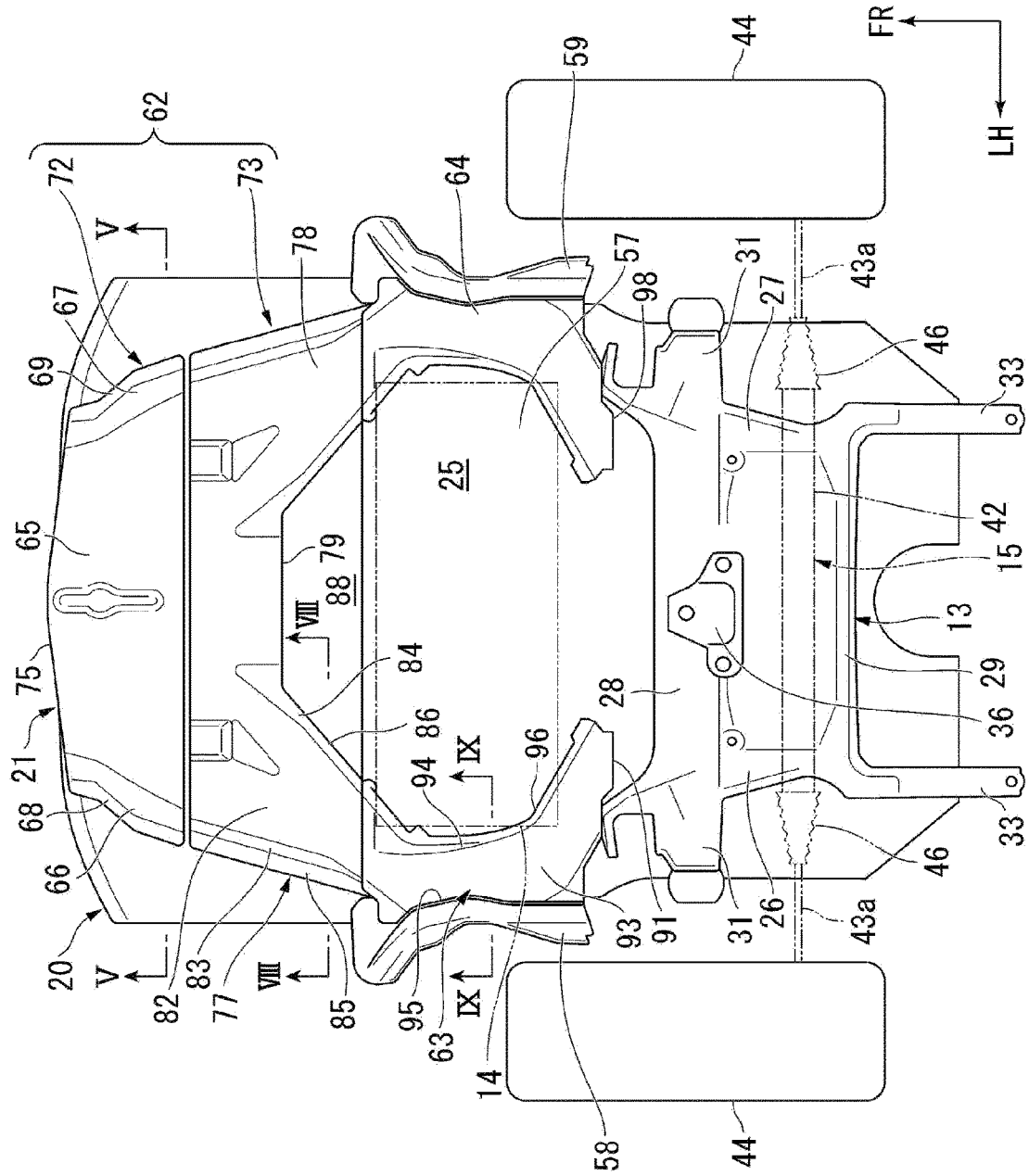
FIG. 3 is a cross-sectional view in which a III part of FIG. 1 is enlarged.

As shown in FIG. 1 and FIG. 3, the steering device 15 is arranged on the subframe 13. Specifically, with regard to the steering device 15, a steering gearbox 42 is attached along an upper surface of the subframe 13 toward the vehicle width direction. In the steering gearbox 42, for example, a steering gear (pinion) (not shown) and a rack shaft 43 are accommodated in a state of being meshed.

Tie rods 43a are connected to both end portions of the rack shaft 43, and extend from both end portions of the steering gear gearbox 42. The left and right tie rods 43a are respectively connected to left and right knuckles (not shown). By operating the steering device 15, the orientation of front wheels 44 at the left and right is changed.

Furthermore, with regard to the steering device 15, for example, a left end portion of the steering gearbox 42 and the left tie rod 43a are covered by a left boot (seal member) 46 made of rubber. Similarly, a right end portion of the steering gearbox 42 and the right tie rod 43a are covered by a right boot (seal member) 46 made of rubber.

Here, for example, the back mount rubber 38 and the front mount rubber 39 supporting the back lower portion 14a of the power device 14, the left and right boots 46 of the steering device 15, and the like are so-called components to be cooled which are required to be cooled because the components are relatively easy to deteriorate due to heat.

Hereinafter, the components to be cooled such as the back mount rubber 38 and the front mount rubber 39, the left and right boots 46, and the like are described as "peripheral components 45".

For example, the peripheral component 45 is arranged at the back of the vehicle body of the power device (engine) 14 and the cooling device 16 described later.

It should be noted that in the embodiment, members such as the back mount rubber 38 and the front mount rubber 39, the left and right boots 46, and the like are illustrated as the peripheral components 45 to be cooled, but the peripheral components 45 to be cooled are not limited to these members.

<Cooling Device>

As shown in FIG. 1 and FIG. 2, the cooling device 16 is disposed at the front of the vehicle body of the power device 14. The cooling device 16 is a component to be cooled including, for example, a condenser 47, a radiator 48, and a cool fan 49.

The condenser 47 is, for example, a heat exchanger that cools and liquefies a refrigerant gas for an air-conditioner. The radiator 48 is a heat exchanger for cooling the cooling water of the power device 14 (specifically, the engine) by outside air (air) to cool the power device 14. The cool fan 49 is arranged at the back of the vehicle body of the condenser 47 and the radiator 48.

It should be noted that in the embodiment, the condenser 47, the radiator 48, the cool fan 49, and the like are illustrated as the cooling device 16, but the cooling device 16 is not limited hereto.

<Shutter Mechanism>

The front bumper face 17 is a member that is disposed at the front of the vehicle of the cooling device 16 and forms a front surface of the vehicle Ve (that is, the vehicle body front structure 10). The front bumper face 17 is formed in a way of covering a front portion of the power device storage room 25. By the front bumper face 17, for example, a bumper beam 52 and the cooling device 16 are covered.

The upper step grille shutter 18 is arranged in an upper step portion in a center of the front bumper face 17 in the vehicle width direction. The upper step grille shutter 18 is disposed facing the upper half of the cooling device 16.

The lower step grille shutter 19 is arranged in a lower step portion in the center of the front bumper face 17 in the vehicle width direction. The lower step grille shutter 19 is disposed facing the lower half of the cooling device 16.

For example, the upper step grille shutter 18 and the lower step grille shutter 19 are configured so as to send outside air (hereinafter referred to as air) to the cooling device 16, the power device 14, and the peripheral component 45 during the travel of the vehicle Ve by being controlled to be opened/closed.

In addition, each shutter of the upper step grille shutter 18 and the lower step grille shutter 19 is controlled to be closed when the cooling device 16, the power device 14, and the peripheral component 45 are not required to be cooled. Thereby, air resistance during the travel of the vehicle can be reduced and fuel efficiency can be improved. Hereinafter, the lower step grille shutter 19 is described as "the shutter mechanism 19".

Figure 4:
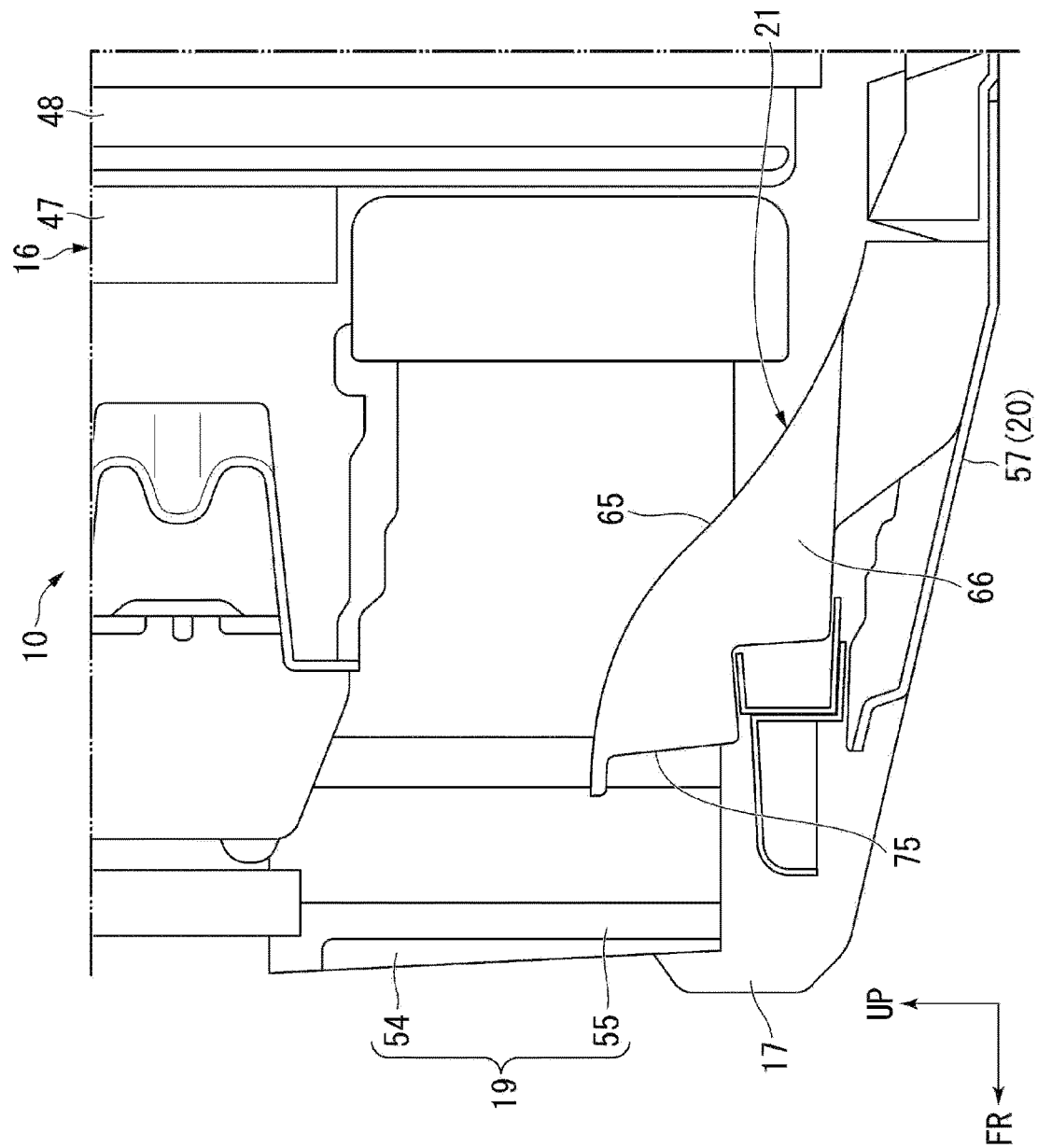
FIG. 4 is a plan view showing the vehicle body front structure of one embodiment.

As shown in FIG. 4, the shutter mechanism 19 includes an upper shutter 54 and a lower shutter 55. The upper shutter 54 is a shutter that sends air to the cooling device 16. The lower shutter 55 is a shutter that is arranged below the upper shutter 54 and sends air to the power device 14 and the peripheral component 45.

<Under Cover>

Back to FIG. 1 and FIG. 2, the under cover 20 is arranged in a way of extending toward the back of the vehicle body from a central portion lower side 17a of the front bumper face 17 in the vehicle width direction. The under cover 20 has: a cover bottom portion 57, a first cover side wall portion (cover side wall portion) 58, and a second cover side wall portion (cover side wall portion) 59.

The cover bottom portion 57 is formed in a way of covering a lower portion of the power device storage room 25 by extending from the central portion lower side 17a of the front bumper face 17 along a lower surface of the subframe 13 to a floor panel (not shown) of a vehicle cabin. That is, the cover bottom portion 57 is formed in a way of covering the power device 14, the cooling device 16, and the peripheral component 45 from below.

The first cover side wall portion 58 is erected upward from a left side end (outer end) of the cover bottom portion 57. The second cover side wall portion 59 is erected upward from a right side end (outer end) of the cover bottom portion 57.

<Cooling Duct>

As shown in FIG. 3, the cooling duct 21 is arranged on an upper surface of the under cover 20, and is formed in a way that air is sent from the lower shutter 55 (see FIG. 2) to the cooling duct 21. The cooling duct 21 is formed in a way of surrounding the outer periphery contour (lower surface contour) of a lower surface 14b (see FIG. 1) of the power device 14. The cooling duct 21 includes: a duct base 62, a first extending portion (extending portion) 63, and a second extending portion (extending portion) 64.

(Duct Base)

The duct base 62 is interposed between the lower shutter 55 and the first extending portion 63 and second extending portion 64, and is formed to be wide in the vehicle width direction. In the duct base 62, the first extending portion 63 and the second extending portion 64 are respectively communicated to left and right sides (both sides) in the vehicle width direction which are formed to be wide.

Figure 5:
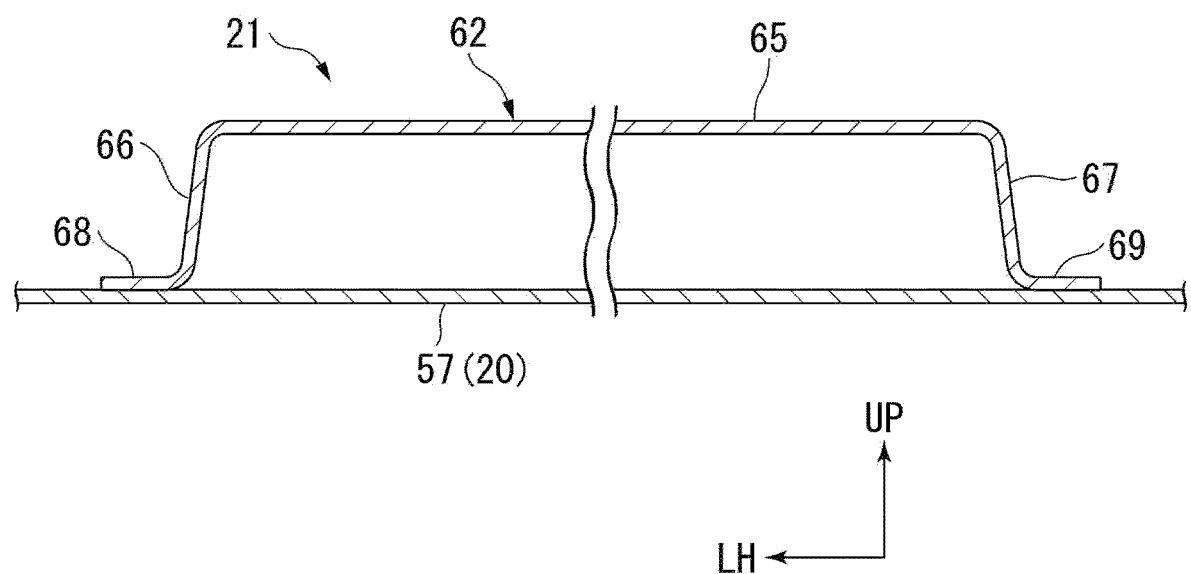
FIG. 5 is a cross-sectional view broken along a V-V line of FIG. 4.

As shown in FIG. 3 and FIG. 5, a main part of the duct base 62 includes: a duct upper portion 65, a first duct side wall portion (one of a pair of duct side wall portions) 66, a second duct side wall portion (the other of the pair of duct side wall portions) 67, a first duct flange (one of a pair of duct flanges) 68, and a second duct flange (the other of the pair of duct flanges) 69.

The duct upper portion 65 is disposed above the under cover 20 (specifically, the cover bottom portion 57) with an interval therebetween. The first duct side wall portion 66 projects from a left end portion (one of both end portions) of the duct upper portion 65 in the vehicle width direction toward the cover bottom portion 57. The second duct side wall portion 67 projects from a right end portion (the other of the both end portions) of the duct upper portion 65 in the vehicle width direction toward the cover bottom portion 57. The first duct flange 68 projects from a lower end portion of the first duct side wall portion 66 along the cover bottom portion 57 toward the left outer side in the vehicle width direction. The second duct flange 69 projects from a lower end portion of the second duct side wall portion 67 along the cover bottom portion 57 toward the right outer side in the vehicle width direction.

That is, the main part of the duct base 62 is formed in a hat shape in cross section by the duct upper portion 65, the first duct side wall portion 66, the second duct side wall portion 67, the first duct flange 68, and the second duct flange 69. With regard to the duct base 62, the first duct flange 68 and the second duct flange 69 are joined to the cover bottom portion 57. Thereby, the main part of the duct base 62 forms a rectangular closed cross section together with the cover bottom portion 57.

Figure 6:
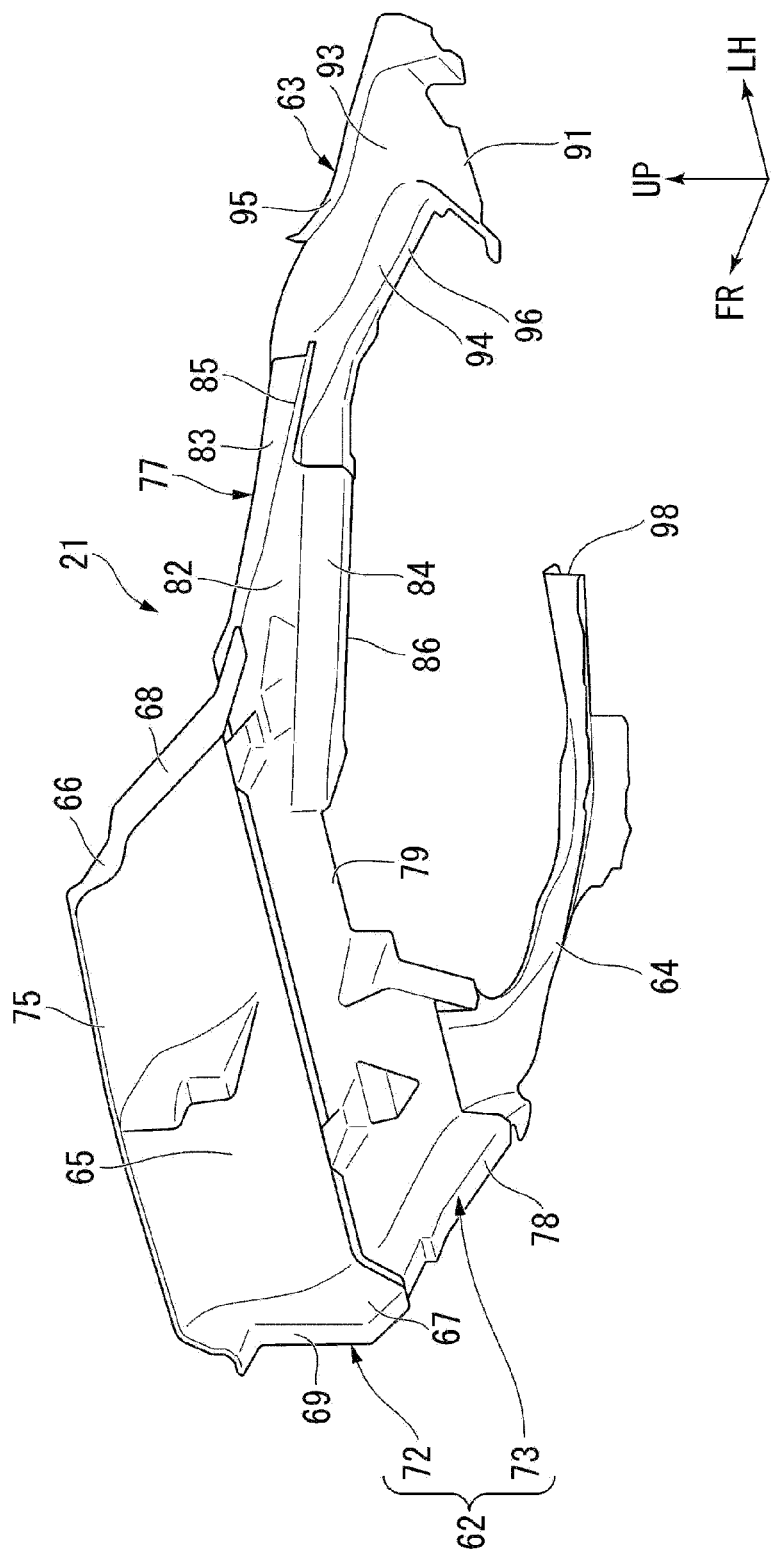
FIG. 6 is a perspective view of a cooling duct included in the vehicle body front structure of one embodiment when viewed from below.
Figure 7:
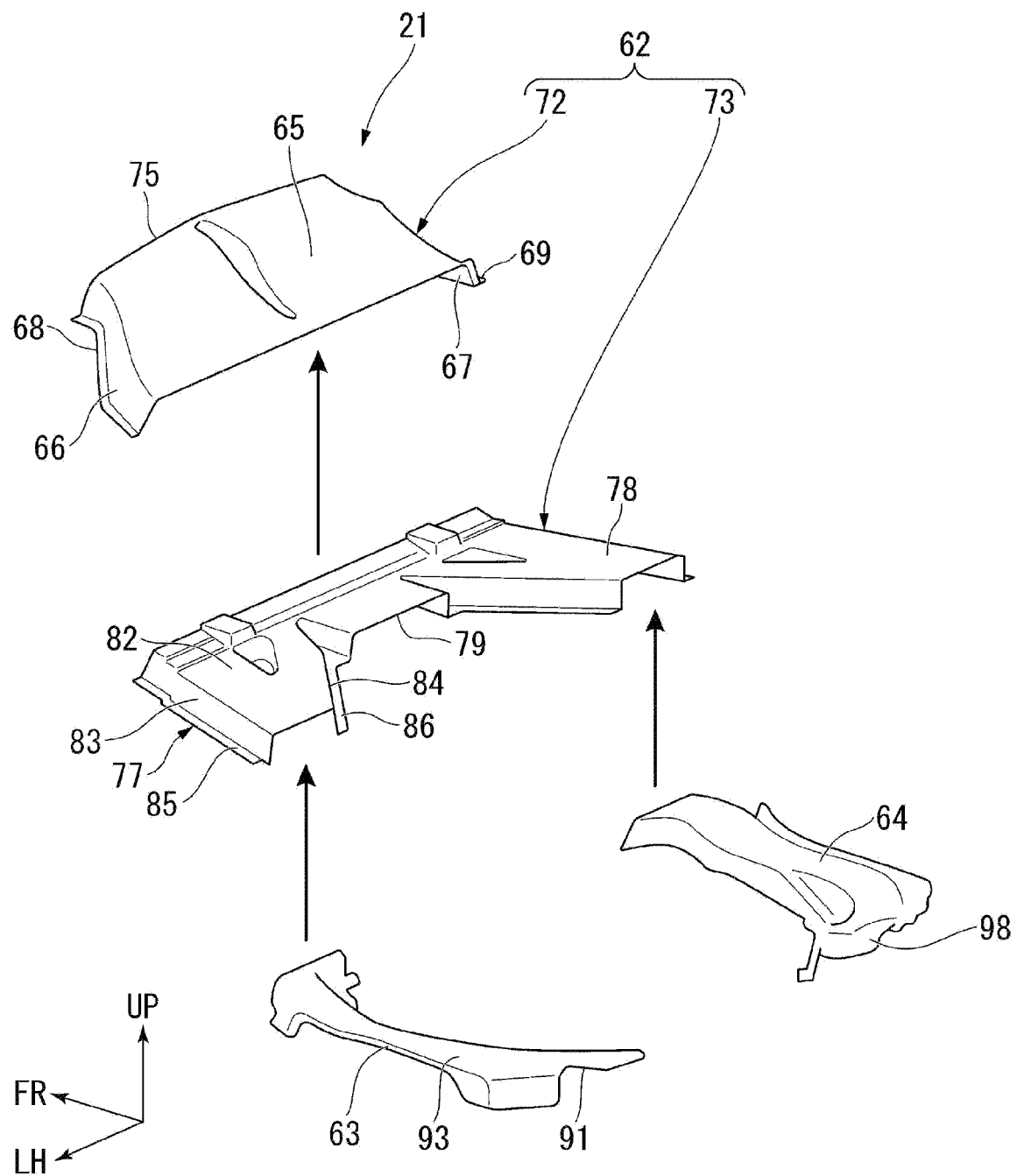
FIG. 7 is a perspective view showing a state in which the cooling duct of one embodiment is disassembled.

As shown in FIG. 4, FIG. 6, and FIG. 7, the duct base 62 is configured by two components, namely an intake portion 72 and a branch portion 73. The intake portion 72 is formed to be wide in the vehicle width direction and includes an intake port portion 75. In the intake port portion 75, an opening is formed to be wide in the vehicle width direction in accordance with a back surface of the lower shutter 55. Accordingly, air from the lower shutter 55 is satisfactorily led to the intake port portion 75.

The branch portion 73 is formed in a way of being communicated to a back end portion of the intake portion 72 and is formed to be wide in the vehicle width direction. The branch portion 73 includes: a first communication portion (one of communication portions) 77, a second communication portion (the other of the communication portions) 78, and a central discharge port portion 79. That is, the branch portion 73 is branched into the first communication portion 77, the second communication portion 78, and the central discharge port portion 79 in a part on the back side of the vehicle body.

The first communication portion 77 is arranged on a left side portion of the branch portion 73 at the back of the vehicle body of the intake portion 72. The first communication portion 77 is communicated to the intake port portion 75 via the intake portion 72, and the first extending portion 63 is communicated to an opening of a back end portion of the first communication portion 77.

Figure 8:
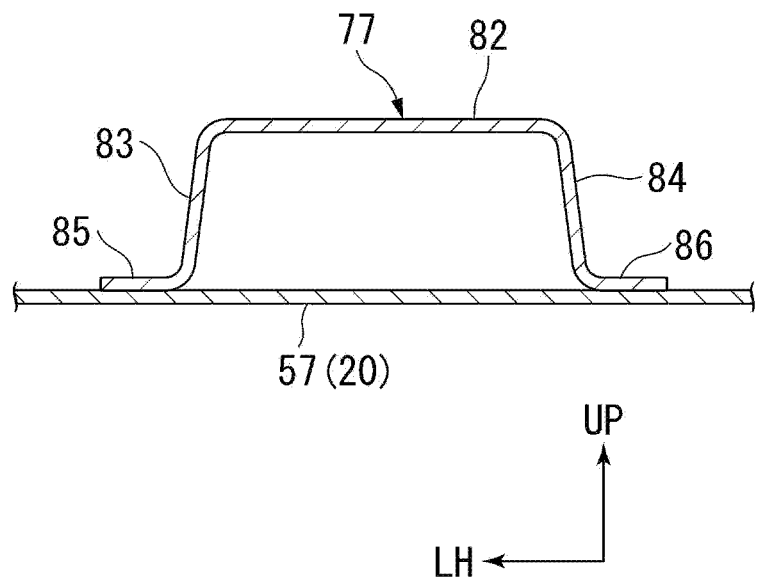
FIG. 8 is a cross-sectional view broken along a VIII-VIII line of FIG. 4.

As shown in FIG. 7 and FIG. 8, the first communication portion 77 has: a communication upper portion 82, a first communication side wall portion (one of a pair of communication side wall portions) 83, a second communication side wall portion (the other of the pair of communication side wall portions) 84, a first communication flange 85, and a second communication flange 86.

The communication upper portion 82 is disposed above the under cover 20 (specifically, the cover bottom portion 57) with an interval therebetween. The first communication side wall portion 83 projects from an outer end portion (one of both end portions) of the communication upper portion 82 in the vehicle width direction toward the cover bottom portion 57. The first communication side wall portion 83 extends in a way of being inclined outward in the vehicle width direction as directed to the back of the vehicle body. The second communication side wall portion 84 projects from an inner end portion (the other of the both end portions) of the communication upper portion 82 in the vehicle width direction toward the cover bottom portion 57. The second communication side wall portion 84 extends in a way of approaching the first communication side wall portion 83 as directed to the back of the vehicle body (also see FIG. 3). The first communication flange 85 projects outward in the vehicle width direction from a lower end portion of the first communication side wall portion 83 along the cover bottom portion 57. The second communication flange 86 projects inward in the vehicle width direction from a lower end portion of the second communication side wall portion 84 along the cover bottom portion 57.

The first communication portion 77 is formed in a hat shape in cross section by the communication upper portion 82, the first communication side wall portion 83, the second communication side wall portion 84, the first communication flange 85, and the second communication flange 86. With regard to the first communication portion 77, the first communication flange 85 and the second communication flange 86 are joined to the cover bottom portion 57. Accordingly, the first communication portion 77 forms a rectangular closed cross section together with the cover bottom portion 57.

Here, the second communication side wall portion 84 extends in a way of approaching the first communication side wall portion 83 as directed to the back of the vehicle body. Accordingly, the first communication portion 77 is formed into an air passage whose cross section is gradually shrunk toward the first extending portion 63 described later. Thereby, a front opening of the first communication portion 77 which faces the intake port portion 75 is ensured to be large. Thus, a relatively large amount of air can be led from the front opening of the first communication portion 77 to the first communication portion 77, and the led air can be sent to the first extending portion 63.

The second communication portion 78 is arranged on a right side portion of the branch portion 73, at the back of the vehicle body of the intake portion 72. The second communication portion 78 is communicated to the intake port portion 75, and the second extending portion 64 (described later) is communicated to an opening of a back end portion of the second communication portion 78.

The second communication portion 78 is formed to be approximately symmetric with the first communication portion 77 in a left-right direction. That is, similar to the first communication portion 77, the second communication portion 78 is formed in a hat shape in cross section, and forms a rectangular closed cross section together with the cover bottom portion 57.

In this way, the first communication portion 77 and the second communication portion 78 are respectively formed in a hat shape in cross section, and respectively form a rectangular closed cross section together with the cover bottom portion 57. Thereby, for example, even if the duct base 62 is formed to be wide in the vehicle width direction, the strength and rigidity of the duct base 62 are ensured by the first communication portion 77 and the second communication portion 78.

In addition, similar to the first communication portion 77, the second communication portion 78 forms an air passage whose cross section is gradually shrunk toward the second extending portion 64 described later. Thereby, a front opening of the second communication portion 78 which faces the intake port portion 75 is ensured to be large. Thus, a relatively large amount of air can be led from the front opening of the second communication portion 78 to the second communication portion 78, and the led air can be sent to the second extending portion 64.

As shown in FIG. 3 and FIG. 7, the central discharge port portion 79 is formed between the first communication portion 77 and the second communication portion 78 in the vehicle width direction. The central discharge port portion 79 is positioned closer to the front of the vehicle body than a front lower portion 14c of the power device 14 (both see FIG. 1), and is opened toward the front lower portion 14c. In addition, the first communication portion 77 and the second communication portion 78 are also positioned closer to the front of the vehicle body than the front lower portion 14c of the power device 14. That is, the central discharge port portion 79, the first communication portion 77, and the second communication portion 78 of the cooling duct 21 are disposed along the front lower portion (front side) 14c of the power device 14.

In this way, with regard to the duct base 62, the branch portion 73 is communicated to the intake portion 72. The intake portion 72 is formed to be wide in the vehicle width direction. Accordingly, similar to the intake portion 72, the branch portion 73 is also formed to be wide in the vehicle width direction. The first communication portion 77 and the second communication portion 78 are communicated to both the left and right sides of the branch portion 73 in the vehicle width direction. Furthermore, the central discharge port portion 79 is formed between the first communication portion 77 and the second communication portion 78. Thereby, an opening area of the central discharge port portion can be ensured to be large.

Furthermore, the first communication portion 77 extends in a way that the second communication side wall portion 84 approaches the first communication side wall portion 83 as directed to the back of the vehicle body. The second communication portion 78 is also formed in the same manner as the first communication portion 77. Accordingly, a space 88 at the back of the vehicle body of the central discharge port portion 79 is formed in a way of gradually widening in the vehicle width direction from the central discharge port portion 79 toward the back of the vehicle body. Thereby, the air sent out from the central discharge port portion 79 can be efficiently and smoothly sent toward the front lower portion 14c of the power device 14 (both see FIG. 1) to the back of the vehicle body.

(First Extending Portion and Second Extending Portion)
As shown in FIG. 3 and FIG. 6, the first extending portion 63 and the second extending portion 64 are respectively communicated to both the left and right sides of the duct base 62 in the vehicle width direction as a pair of extending portions. The first extending portion 63 and the second extending portion 64 are members that are approximately symmetric with each other in the left-right direction. Accordingly, hereinafter, the first extending portion 63 is described in detail and detailed descriptions of the second extending portion 64 are omitted.

The first extending portion 63 is communicated to a back end of the first communication portion 77, and extends toward the back of the vehicle body along a left side portion of an upper surface of the under cover 20 (specifically, the cover bottom portion 57). The first extending portion 63 is communicated to the intake port portion 75 of the duct base 62. The first extending portion 63 extends to the vicinity of the peripheral component 45 (see FIG. 1) in an arc shape in a way of bypassing the left outer side in the vehicle width direction of the power device 14 in a plan view.

A first discharge port portion (discharge port portion) 91 is arranged at a distal end (back end) of the first extending portion 63. In a state of being communicated to the intake port portion 75, the first discharge port portion 91 is positioned at the back of the vehicle body of the power device 14, and is disposed in the vicinity of the front side of the vehicle body of the peripheral component 45. Accordingly, air is led from the first discharge port portion 91 toward the peripheral component 45.

Figure 9:
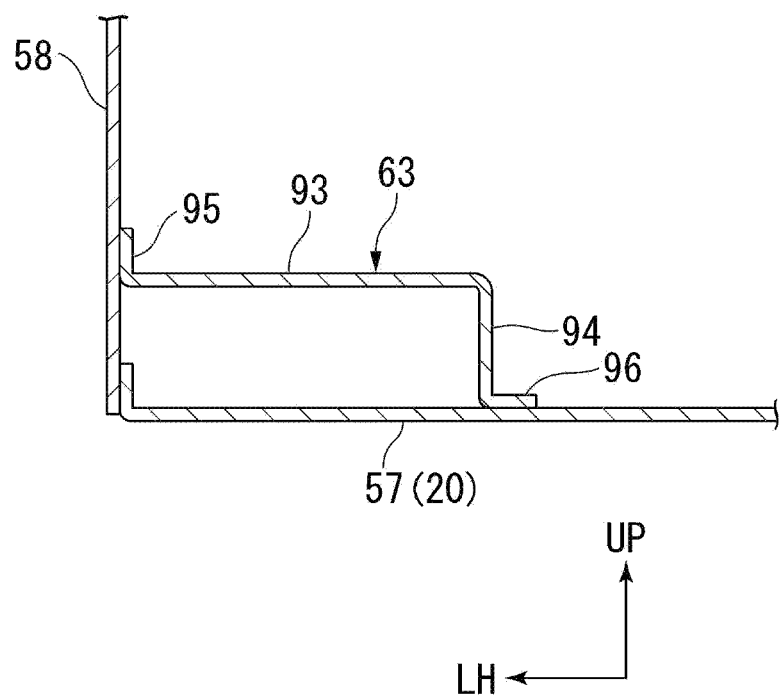
FIG. 9 is a cross-sectional view broken along a IX-IX line of FIG. 4.

As shown in FIG. 6 and FIG. 9, the first extending portion 63 has an extending upper portion 93 and an extending side wall portion 94. The extending upper portion 93 is disposed above the cover bottom portion 57 with an interval therebetween. The extending side wall portion 94 projects from an inner end portion of the extending upper portion 93 in the vehicle width direction toward the cover bottom portion 57.

The first extending portion 63 is formed in an L-shape in cross section by the extending upper portion 93 and the extending side wall portion 94. Furthermore, the first extending portion 63 has an upper portion flange 95 and a side wall portion flange 96. The upper portion flange 95 projects upward from a left end portion of the extending upper portion 93. The side wall portion flange 96 projects inward in the vehicle width direction from a lower end portion of the extending side wall portion 94.

With regard to the first extending portion 63, the upper portion flange 95 is joined to the first cover side wall portion 58, the side wall portion flange 96 is joined to the cover bottom portion 57 (also see FIG. 3). Thereby, the first extending portion 63 forms a rectangular closed cross section together with the under cover 20.

As shown in FIG. 3 and FIG. 6, the second extending portion 64 is a member that is approximately symmetric with the first extending portion 63 in the left-right direction. That is, the second extending portion 64 is communicated to a back end of the second communication portion 78, and extends toward the back of the vehicle body along a right side portion of the upper surface of the under cover 20 (specifically, the cover bottom portion 57). The second extending portion 64 is communicated to the intake port portion 75 of the duct base 62. The second extending portion 64 extends to the vicinity of the peripheral component 45 (see FIG. 1) in an arc shape in a way of bypassing the right outer side in the vehicle width direction of the power device 14 in a plan view.

A second discharge port portion (discharge port portion) 98 is arranged at a distal end (back end) of the second extending portion 64. In a state of being communicated to the intake port portion 75, the second discharge port portion 98 is positioned at the back of the vehicle body of the power device 14, and is disposed in the vicinity of the front side of the vehicle body of the peripheral component 45. Accordingly, air is led from the second discharge port portion 98 toward the peripheral component 45. The second extending portion 64 forms a rectangular closed cross section together with the under cover 20.

In this way, the first extending portion 63 and the second extending portion 64 are arranged on both the left and right sides of the duct base 62 in the vehicle width direction. In addition, the first extending portion 63 and the second extending portion 64 are made to bypass the outer side in the vehicle width direction of the power device 14 and are extended to the vicinity of the peripheral component 45. Furthermore, at the distal ends of the first extending portion 63 and the second extending portion 64, the first discharge port portion 91 and the second discharge port portion 98 are respectively arranged.

Accordingly, for example, outside air introduced from the lower shutter 55 can efficiently cool the peripheral component 45 from the first discharge port portion 91 and the second discharge port portion 98 without being heated by the power device 14. Thereby, the sealing degree of the power device storage room 25 can be maintained high, and the cooling of the peripheral component 45 can be ensured, and thereby air resistance of the vehicle Ve (see FIG. 1) can be reduced and fuel efficiency can be improved.

In addition, the first extending portion 63 and the second extending portion 64 are formed in an arc shape in a way of bypassing the outer side in the vehicle width direction of the power device 14. Accordingly, air guided from the duct base 62 (that is, the lower shutter 55) to the first extending portion 63 and the second extending portion 64 can be smoothly led to the first discharge port portion 91 and the second discharge port portion 98.

Thereby, the air guided to the first extending portion 63 and the second extending portion 64 can be sent from the first discharge port portion 91 and the second discharge port portion 98 to the peripheral component 45 while maintaining an outside air temperature. Thus, the peripheral component 45 can be efficiently cooled by the air sent from the first discharge port portion 91 and the second discharge port portion 98.

Furthermore, the first extending portion 63 is formed in an L-shape in cross section, and forms a rectangular closed cross section by using the cover bottom portion 57 and the first cover side wall portion 58 of the under cover 20. In addition, the second extending portion 64 is formed in an L-shape in cross section, and forms a rectangular closed cross section by using the cover bottom portion 57 and the second cover side wall portion 59 of the under cover 20. Thereby, in a space of the power device storage room 25 which is limited, the rectangular closed cross sections of the first extending portion 63 and the second extending portion 64 can be formed to be large and the cross section of the air passage can be sufficiently ensured.

In addition, the rectangular closed cross section is formed by the first extending portion 63 and the under cover 20, and furthermore, the rectangular closed cross section is formed by the second extending portion 64 and the under cover 20. Thereby, the bending rigidity of the under cover 20 can be improved by each rectangular closed cross section.

Moreover, the first communication portion 77 is formed into the air passage whose cross section is gradually shrunk toward the first extending portion 63, and the front opening of the first communication portion 77 facing the intake port portion 75 is ensured to be large. Similarly, the second communication portion 78 is formed into the air passage whose cross section is gradually shrunk toward the second extending portion 64, and the front opening of the second communication portion 78 facing the intake port portion 75 is ensured to be large.

Accordingly, the amount of cool air that is led to the first communication portion 77 and the second communication portion 78 and does not cool the power device 14 can be increased. Thereby, the amount of cool air sent out from the first discharge port portion 91 to the peripheral component 45 through the first extending portion 63, and the amount of cool air sent out from the second discharge port portion 98 to the peripheral component 45 through the second extending portion 64 can be increased.

In addition, the central discharge port portion 79, the first communication portion 77, and the second communication portion 78 of the cooling duct 21 are disposed along the front side of the power device 14. The first extending portion 63 extends in an arc shape in a way of bypassing the left outer side in the vehicle width direction of the power device 14. The second extending portion 64 extends in an arc shape in a way of bypassing the right outer side in the vehicle width direction of the power device 14. Accordingly, the cooling duct 21 is configured in a way of surrounding the outer periphery contour of the lower surface 14b (see FIG. 1) of the power device 14.

Thereby, for example, the first extending portion 63 and the second extending portion 64 can be attached by using a space between the lower surface 14b of the power device 14 and the under cover 20. Thus, even if the power device storage room 25 is made compact, the rectangular cross sections of the first extending portion 63 and the second extending portion 64 can be formed to be large and the cross section of the air passage can be sufficiently ensured.

As shown in FIG. 6, the cooling duct 21 is configured by four components, namely the intake portion 72, the branch portion 73, the first extending portion 63, and the second extending portion 64.

Here, the intake portion 72 is formed to be wide in the vehicle width direction, and the intake port portion 75 is arranged in the intake portion 72. In addition, the branch portion 73 is communicated to the intake portion 72, and the first communication portion 77, the second communication portion 78, and the central discharge port portion 79 are respectively branched in the branch portion 73. Furthermore, the first extending portion 63 extends from the first communication portion 77 to the vicinity of the peripheral component 45. Moreover, the second extending portion 64 extends from the second communication portion 78 to the vicinity of the peripheral component 45.

Therefore, the cooling duct 21 including the intake portion 72, the branch portion 73, the first extending portion 63, and the second extending portion 64 has a complex shape. Thus, the cooling duct 21 is configured by four components, namely the intake portion 72, the branch portion 73, the first extending portion 63, and the second extending portion 64. Accordingly, the four components, namely the intake portion 72, the branch portion 73, the first extending portion 63, and the second extending portion 64, can be formed in a simple shape. Thereby, the cooling duct 21 can be easily manufactured by individually forming the four components, namely the intake portion 72, the branch portion 73, the first extending portion 63, and the second extending portion 64, and assembling the four formed components.

Alternatively, the intake portion 72 and the branch portion 73 may be made integrated and compact.

As described above, according to the vehicle body front structure 10 of the embodiment, as shown in FIG. 1 and FIG. 2, the upper shutter 54 and the lower shutter 55 are included in the shutter mechanism 19, and air is sent from the upper shutter 54 to the cooling device 16. Accordingly, the cooling device 16 can be cooled by the air sent from the upper shutter 54. In addition, the cooling duct 21 is communicated to the lower shutter 55, the air sent out from the central discharge port portion 79 of the cooling duct 21 can be sent toward the front lower portion 14c of the power device 14 to the back of the vehicle body as shown by an arrow A. Thereby, the power device 14 can be efficiently cooled by the air sent out from the central discharge port portion 79.

In addition, the air that has cooled the power device 14 can be sent to the peripheral component 45 through the space between the power device 14 and the under cover 20 (specifically, the cover bottom portion 57) as shown by an arrow B. Thereby, the peripheral component 45 can be cooled by the air that has cooled the power device 14.

Furthermore, air led from the lower shutter 55 to the first discharge port portion 91 can be sent to the peripheral component 45 as shown by an arrow C. In addition, air led from the lower shutter 55 to the second discharge port portion 98 can be sent to the peripheral component 45 as shown by an arrow D.

Thereby, the peripheral component 45 can be cooled by the air sent from the lower shutter 55 through the first discharge port portion 91 and the second discharge port portion 98. In this way, the peripheral component 45 is cooled by the air that has cooled the power device 14, and the peripheral component 45 is cooled by the air sent from the first discharge port portion 91 and the second discharge port portion 98. Thereby, the peripheral component 45 can be efficiently cooled and deterioration of the peripheral component 45 can be suppressed.

Furthermore, by efficiently cooling the power device 14 and the peripheral component 45, the sealing degree of the power device storage room 25 accommodating the power device 14 can be increased. Thereby, air resistance of the vehicle Ve can be reduced and fuel efficiency can be improved.

In this way, according to the vehicle body front structure 10, fuel efficiency can be improved, and components to be cooled such as the power device 14, the peripheral component 45, and the like can be efficiently cooled.

In addition, because the shutter mechanism 19 is divided into the upper shutter 54 and the lower shutter 55, each of the upper shutter 54 and the lower shutter 55 can be formed to be horizontally long to increase the opening area, and sufficient outside air can be introduced.

In addition, the duct base 62 of the cooling duct 21 is formed to be wide in the vehicle width direction, and the intake port portion 75 is arranged in the duct base 62. Thereby, a large amount of air can be collectively sucked from the intake port portion 75 to the duct base 62. Furthermore, the first extending portion 63 and the second extending portion 64 are respectively communicated to both the left and right sides of the duct base 62, and the central discharge port portion 79 is opened between the first extending portion 63 and the second extending portion 64. Thereby, by the air sent from the central discharge port portion 79, the power device 14 can be cooled, and the peripheral component 45 arranged closer to the back of the vehicle body than the power device 14 can be cooled.

Moreover, the peripheral component 45 is cooled by the air sent from the first discharge port portion 91 through the first extending portion 63, and furthermore, the peripheral component 45 is cooled by the air sent from the second discharge port portion 98 through the second extending portion 64. The air sent from the first discharge port portion 91 (also see FIG. 3) and the second discharge port portion 98 does not cool the power device 14. Accordingly, the air sent from the first discharge port portion 91 (also see FIG. 3) and the second discharge port portion 98 is maintained to be cooler than the air that is sent from the central discharge port portion 79 and has cooled the power device 14.

In this way, by cooling the peripheral component 45 with both the air sent from the central discharge port portion 79 and the air sent from the first discharge port portion 91 and the second discharge port portion 98, the peripheral component 45 can be efficiently cooled.

It should be noted that the technical range of the disclosure is not limited to the embodiment, and various modifications can be added without departing from the gist of the disclosure.

According to the configuration, the upper shutter and the lower shutter are included in the shutter mechanism, air (that is, outside air) is sent from the upper shutter to the cooling device for cooling the power device. Accordingly, the cooling device can be cooled by the air sent from the upper shutter.

In addition, the cooling duct is communicated to the lower shutter, and the discharge port portion of the cooling duct is disposed in a position where air is led toward the peripheral component. Accordingly, the air led from the lower shutter to the discharge port portion can be sent to the peripheral component through the discharge port portion. Thereby, the peripheral component can be cooled by the air sent from the lower shutter through the discharge port portion.

In this way, the cooling device is cooled by the air sent from the upper shutter, and the peripheral component is cooled by the air sent from the lower shutter through the discharge port portion. Thereby, components to be cooled such as the cooling device (that is, the power device), the peripheral component, and the like can be efficiently cooled. Furthermore, by efficiently cooling the power device and the peripheral component (that is, the peripheral component disposed behind the power device (engine)), the sealing degree of the power device storage room (for example, the engine room) that accommodates the power device can be increased. Accordingly, air resistance can be reduced during the travel of the vehicle and fuel efficiency can be improved. In this way, according to the vehicle body front structure, the fuel efficiency can be improved, and the components to be cooled (for example, the power device and the peripheral component) can be efficiently cooled. In addition, because the shutter mechanism is divided into the upper shutter and the lower shutter, each shutter can be formed to be horizontally long to increase the opening area, and sufficient outside air can be introduced.

(2) The cooling duct includes a pair of extending portions (for example, a first extending portion 63 and a second extending portion 64 of the embodiment) which are arranged on the left side and the right side in a vehicle width direction along the under cover in a state of being communicated to the intake port portion. With regard to the pair of extending portions, each of the pair of extending portions bypasses the outer side in the vehicle width direction of the power device and extends toward the back of the vehicle body to the vicinity of the peripheral component, and the discharge port portion is arranged at a distal end of each of the pair of extending portions.

According to the configuration, the pair of extending portions are arranged on both the left and right sides in the vehicle width direction. Furthermore, each of the extending portions is made to bypass the outer side in the vehicle width direction of the power device and is extended to the vicinity of the peripheral component, and the discharge port portion is arranged at the distal end of the extending portion. Accordingly, for example, outside air introduced from the lower shutter can efficiently cool the peripheral component from the discharge port portion without being heated by the power device.

Thereby, the sealing degree of the power device storage room can be maintained high, and the cooling of the peripheral component can be ensured, and thereby air resistance can be reduced and fuel efficiency can be improved.

(3) Each of the pair of extending portions may be formed in an arc shape in a plan view in a way of bypassing the outer side in the vehicle width direction of the power device.

According to the configuration, the extending portions are formed in an arc shape in a plan view, and are made to bypass the outer side in the vehicle width direction of the power device. By forming the extending portions in an arc shape in a plan view, air guided from the lower shutter to the extending portions can be smoothly led to the discharge port portion.

Thereby, the air guided from the lower shutter to the extending portions can be sent from the discharge port portion to the peripheral component while maintaining an outside air temperature, and the peripheral component can be efficiently cooled by the sent air.

(4) The cooling duct may include: a duct base (for example, a duct base 62 of the embodiment) which is interposed between the lower shutter and the extending portions, and is formed to be wide in the vehicle width direction and the pair of extending portions are communicated to both sides in the vehicle width direction. The duct base may include: the intake port portion; and a central discharge port portion (for example, a central discharge port portion 79 of the embodiment) that is opened to the front of the vehicle body of the power device between the pair of extending portions.

According to the configuration, the duct base is included in the cooling duct, and the duct base is formed to be wide in the vehicle width direction. Furthermore, the intake port portion is included in the duct base. Thereby, a large amount of air can be collectively sucked from the intake port portion to the duct base.

In addition, the extending portions are communicated to the both sides of the duct base, and the central discharge port portion is opened between the extending portions. Thereby, the air sent from the central discharge port portion can cool the power device, and can cool the peripheral component arranged closer to the back of the vehicle body than the power device.

Additionally, the peripheral component is cooled by the air sent from the discharge port portion through the extending portion. The air sent from the discharge port portion through the extending portion does not cool the power device, thus being maintained in a state of being cooler than the air sent out from the central discharge port portion.

In this way, a large amount of air is collectively sucked from the intake port portion to the duct base, and the large amount of sucked air is sent out from the central discharge port portion and the pair of discharge port portions to the power device and the peripheral component. Accordingly, the peripheral component can be cooled by both the air that is sent from the central discharge port portion and cools the power device and the air that is sent from the discharge port portions and does not cool the power device. Thereby, the peripheral component can be efficiently cooled by the air sent from the cooling duct.

(5) The duct base may include: an intake portion (for example, an intake portion 72 of the embodiment) in which the intake port portion is arranged and which is formed to be wide in the vehicle width direction; and a branch portion (for example, a branch portion 73 of the embodiment) which is communicated to the intake portion at the back of the vehicle body of the intake portion, and in which the central discharge port portion and a pair of communication portions (for example, a first communication portion 77 and a second communication portion 78 of the embodiment) to which the extending portions are communicated are branched. The cooling duct may be configured by four components which are: the intake portion, the branch portion, and the pair of extending portions.

Here, the intake portion is formed to be wide in the vehicle width direction, and the intake port portion is arranged in the intake portion. The branch portion is communicated to the intake portion, and the pair of communication portions and the central discharge port portion are branched in the branch portion. The extending portions extend from the pair of communication portions to the vicinity of the peripheral component. Therefore, the cooling duct including the intake portion, the branch portion, and the pair of extending portions has a complex shape. Thus, the cooling duct is configured by four components which are: the intake portion, the branch portion, and the pair of extending portions.

Accordingly, the four components, namely the intake portion, the branch portion, and the pair of extending portions, can be formed in a simple shape. Thereby, the four components, namely the intake portion, the branch portion, and the pair of extending portions, can be individually formed, and the cooling duct can be easily manufactured by assembling the four formed components. Alternatively, the intake portion and the branch portion may be made integrated and compact.

(6) The duct base may be formed in a hat shape in cross section by: a duct upper portion (for example, a duct upper portion 65 of the embodiment) which is disposed above the under cover with an interval therebetween; a pair of duct side wall portions (for example, a first duct side wall portion 66 and a second duct side wall portion 67 of the embodiment) projecting toward the under cover from both end portions of the duct upper portion in the vehicle width direction; and a pair of duct flanges (for example, a first duct flange 68 and a second duct flange 69 of the embodiment) projecting outward in the vehicle width direction along the under cover from the pair of duct side wall portions. A rectangular closed cross section may be formed by the duct base and the under cover.

According to the configuration, the duct base is formed in a hat shape in cross section, and the rectangular closed cross section is formed by the duct base and the under cover. Thereby, the strength and rigidity of the duct base can be ensured even if the duct base is formed to be wide in the vehicle width direction.

(7) Each of the pair of communication portions may be formed in a hat shape in cross section by: a communication upper portion (for example, a communication upper portion 82 of the embodiment) which is disposed above the under cover with an interval therebetween; a pair of communication side wall portions (for example, a first communication side wall portion 83 and a second communication side wall portion 84 of the embodiment) projecting toward the under cover from both end portions of the communication upper portion in the vehicle width direction; a first communication flange (for example, a first communication flange 85 of the embodiment) projecting outward in the vehicle width direction along the under cover from the outer communication side wall portion of the pair of communication side wall portions in the vehicle width direction; and a second communication flange (for example, a second communication flange 86 of the embodiment) projecting inward in the vehicle width direction along the under cover from the inner communication side wall portion of the pair of communication side wall portions in the vehicle width direction. By the communication portion and the under cover, a rectangular closed cross section may be formed which serves as an air passage whose cross section is gradually shrunk toward the extending portion.

According to the configuration, the communication portion is formed in a hat shape in cross section, and the rectangular closed cross section is formed by the communication portion and the under cover. Thereby, the strength and rigidity of the under cover and the communication portion can be ensured.
Furthermore, by the communication portion and the under cover, the air passage whose cross section is gradually shrunk toward the extending portion is formed. Accordingly, the amount of cool air that is led to the communication portion and does not cool the power device can be increased. Thereby, the amount of the cool air sent out from the discharge port portion through the extending portion can be increased.

(8) The central discharge port portion may be formed between the pair of communication portions in the vehicle width direction.

Here, the branch portion is communicated to the intake portion. The intake portion is formed to be wide in the vehicle width direction. Accordingly, similar to the intake portion, the branch portion is also formed to be wide in the vehicle width direction. The communication portions are communicated to both the left and right sides of the branch portion in the vehicle width direction. Furthermore, the central discharge port portion is set between the pair of communication portions. Thereby, an opening area of the central discharge port portion can be ensured to be large.

Furthermore, the pair of communication portions are formed in a way that the cross section is gradually shrunk toward the extending portions. Accordingly, a space at the back of the vehicle body of the central discharge port portion is formed in a way of gradually widening in the vehicle width direction from the central discharge port portion toward the back of the vehicle body. Thereby, the air sent out from the central discharge port portion can be efficiently and smoothly led toward the back of the vehicle body.

(9) The cooling duct may be formed in a way of surrounding the lower surface contour of the power device.

According to the configuration, the lower surface contour of the power device is surrounded by the cooling duct. Accordingly, for example, the extending portion of the cooling duct can be attached by using a space between a lower surface of the power device and the under cover. Thereby, even if the power device storage room is made compact, the rectangular cross section of the extending portion can be formed to be large and the cross section of the air passage can be sufficiently ensured.

(10) Each of the pair of extending portions may be formed in an L-shape in cross section by: an extending upper portion (for example, an extending upper portion 93 of the embodiment) which is disposed above the under cover with an interval therebetween; and an extending side wall portion (for example, an extending side wall portion 94 of the embodiment) projecting toward the under cover from an inner end portion of the extending upper portion in the vehicle width direction. The under cover may have: a cover bottom portion (for example, a cover bottom portion 57 of the embodiment) which covers the power device, the cooling device, and the peripheral component from below; and a cover side wall portion (for example, a first cover side wall portion 58 and a second cover side wall portion 59 of the embodiment) which is erected upward from an outer end of the cover bottom portion. A rectangular closed cross section may be formed by the extending portion and the under cover.

According to the configuration, the extending portion is formed in an L-shape in cross section, and the rectangular closed cross section is formed by the cover bottom portion and the cover side wall portion of the under cover. In this way, by using the cover bottom portion and the cover side wall portion of the under cover to form the rectangular closed cross section, the rectangular closed cross section of the extending portion can be formed to be large and the cross section of the air passage can be sufficiently ensured in a space of the power device storage room which is limited. In addition, by forming the rectangular closed cross section by the extending portion having an approximately L-shaped cross section and the under cover, the bending rigidity of the under cover can be increased.

According to the disclosure, fuel efficiency can be improved and components to be cooled can be efficiently cooled.

In addition, within a range not departing from the gist of the disclosure, the constituent elements in the embodiment can be appropriately replaced by well-known constituent elements, and the variation examples described above may be appropriately combined.

What is claimed is:

1. A vehicle body front structure, comprising:
a shutter mechanism which comprises an upper shutter that sends air to a cooling device for cooling a power device, and a lower shutter that is arranged below the upper shutter and sends air to a peripheral component arranged at a back of a vehicle body of the cooling device;
an under cover which covers the power device, the cooling device, and the peripheral component from below; and
a cooling duct which is arranged along the under cover and to which air is sent from the lower shutter; wherein
the cooling duct comprises:
an intake port portion which is communicated to the lower shutter and to which air is sent from the lower shutter, and
a discharge port portion which is positioned at the back of the vehicle body of the power device in a state of being communicated to the intake port portion, and sends air toward the peripheral component,
wherein in a front-rear direction of the vehicle body, the power device is located between the intake port portion and the discharge port portion.

2. The vehicle body front structure according to claim 1, wherein
the cooling duct comprises
a pair of extending portions which are arranged along the under cover on a left side and a right side in a vehicle width direction in a state of being communicated to the intake port portion, and
with regard to the pair of extending portions,
each of the pair of extending portions bypasses an outer side in the vehicle width direction of the power device and extends toward the back of the vehicle body to a vicinity of the peripheral component, and the discharge port portion is arranged at a distal end of each of the pair of extending portions.

3. The vehicle body front structure according to claim 2, wherein
each of the pair of extending portions is formed in an arc shape in a plan view in a way of bypassing the outer side in the vehicle width direction of the power device.

4. The vehicle body front structure according to claim 2, wherein
the cooling duct comprises
a duct base which is interposed between the lower shutter and the pair of extending portions, and is formed to be wide in the vehicle width direction and the pair of extending portions are communicated to both sides in the vehicle width direction, and
the duct base comprises:
the intake port portion, and
a central discharge port portion that is opened to a front of the vehicle body of the power device between the pair of extending portions.

5. The vehicle body front structure according to claim 4, wherein
the duct base comprises:
an intake portion in which the intake port portion is arranged and which is formed to be wide in the vehicle width direction, and
a branch portion which is communicated to the intake portion at the back of the vehicle body of the intake portion, and in which the central discharge port portion and a pair of communication portions to which the extending portions are communicated are branched, and
the cooling duct comprises four components which are:
the intake portion, the branch portion, and the pair of extending portions.

6. The vehicle body front structure according to claim 4, wherein
the duct base is formed in a hat shape in cross section by:
a duct upper portion which is disposed above the under cover with an interval therebetween,
a pair of duct side wall portions projecting toward the under cover from both end portions of the duct upper portion in the vehicle width direction, and
a pair of duct flanges projecting outward in the vehicle width direction along the under cover from the pair of duct side wall portions; and
a rectangular closed cross section is formed by the duct base and the under cover.

7. The vehicle body front structure according to claim 5, wherein
each of the pair of communication portions is formed in a hat shape in cross section by:
a communication upper portion which is disposed above the under cover with an interval therebetween,
a pair of communication side wall portions projecting toward the under cover from both end portions of the communication upper portion in the vehicle width direction,
a first communication flange projecting outward in the vehicle width direction along the under cover from an outer communication side wall portion of the pair of communication side wall portions in the vehicle width direction, and
a second communication flange projecting inward in the vehicle width direction along the under cover from an inner communication side wall portion of the pair of communication side wall portions in the vehicle width direction; and
by the communication portion and the under cover, a rectangular closed cross section is formed which serves as an air passage whose cross section is gradually shrunk toward the extending portions.

8. The vehicle body front structure according to claim 7, wherein
the central discharge port portion is formed between the pair of communication portions in the vehicle width direction.

9. The vehicle body front structure according to claim 1, wherein
the cooling duct is formed in a way of surrounding a lower surface contour of the power device.

10. The vehicle body front structure according to claim 2, wherein
each of the pair of extending portions is formed in an L-shape in cross section by:
an extending upper portion which is disposed above the under cover with an interval therebetween, and
an extending side wall portion projecting toward the under cover from an inner end portion of the extending upper portion in the vehicle width direction;
the under cover comprises:
a cover bottom portion which covers the power device, the cooling device, and the peripheral component from below, and a cover side wall portion which is erected upward from an outer end of the cover bottom portion; and
a rectangular closed cross section is formed by the extending portion and the under cover.

11. The vehicle body front structure according to claim 3, wherein
the cooling duct comprises
a duct base which is interposed between the lower shutter and the pair of extending portions, and is formed to be wide in the vehicle width direction and the pair of extending portions are communicated to both sides in the vehicle width direction, and
the duct base comprises:
the intake port portion, and
a central discharge port portion that is opened to a front of the vehicle body of the power device between the pair of extending portions.

12. The vehicle body front structure according to claim 5, wherein
the duct base is formed in a hat shape in cross section by:
a duct upper portion which is disposed above the under cover with an interval therebetween,
a pair of duct side wall portions projecting toward the under cover from both end portions of the duct upper portion in the vehicle width direction, and
a pair of duct flanges projecting outward in the vehicle width direction along the under cover from the pair of duct side wall portions; and
a rectangular closed cross section is formed by the duct base and the under cover.

13. A vehicle body front structure, comprising:
a shutter mechanism which comprises an upper shutter that sends air to a cooling device for cooling a power device, and a lower shutter that is arranged below the upper shutter and sends air to a peripheral component arranged at a back of a vehicle body of the cooling device;
an under cover which covers the power device, the cooling device, and the peripheral component from below; and
a cooling duct which is arranged along the under cover and to which air is sent from the lower shutter; wherein
the cooling duct comprises:
an intake port portion which is communicated to the lower shutter and to which air is sent from the lower shutter, and
a discharge port portion which is positioned at the back of the vehicle body of the power device in a state of being communicated to the intake port portion, and sends air toward the peripheral component,
wherein the cooling duct comprises
a pair of extending portions which are arranged along the under cover on a left side and a right side in a vehicle width direction in a state of being communicated to the intake port portion, and
with regard to the pair of extending portions,
each of the pair of extending portions bypasses an outer side in the vehicle width direction of the power device and extends toward the back of the vehicle body to a vicinity of the peripheral component, and the discharge port portion is arranged at a distal end of each of the pair of extending portions wherein the cooling duct comprises
a duct base which is interposed between the lower shutter and the pair of extending portions, and is formed to be wide in the vehicle width direction and the pair of extending portions are communicated to both sides in the vehicle width direction, and
the duct base comprises:
the intake port portion, and
a central discharge port portion that is opened to a front of the vehicle body of the power device between the pair of extending portions.

14. A vehicle body front structure, comprising:
a shutter mechanism which comprises an upper shutter that sends air to a cooling device for cooling a power device, and a lower shutter that is arranged below the upper shutter and sends air to a peripheral component arranged at a back of a vehicle body of the cooling device;
an under cover which covers the power device, the cooling device, and the peripheral component from below; and
a cooling duct which is arranged along the under cover and to which air is sent from the lower shutter; wherein
the cooling duct comprises:
an intake port portion which is communicated to the lower shutter and to which air is sent from the lower shutter, and
a discharge port portion which is positioned at the back of the vehicle body of the power device in a state of being communicated to the intake port portion, and sends air toward the peripheral component,
wherein the cooling duct comprises
a pair of extending portions which are arranged along the under cover on a left side and a right side in a vehicle width direction in a state of being communicated to the intake port portion, and
with regard to the pair of extending portions,
each of the pair of extending portions bypasses an outer side in the vehicle width direction of the power device and extends toward the back of the vehicle body to a vicinity of the peripheral component, and the discharge port portion is arranged at a distal end of each of the pair of extending portions,
each of the pair of extending portions is formed in an L-shape in cross section by:
an extending upper portion which is disposed above the under cover with an interval therebetween, and
an extending side wall portion projecting toward the under cover from an inner end portion of the extending upper portion in the vehicle width direction;
the under cover comprises:
a cover bottom portion which covers the power device, the cooling device, and the peripheral component from below, and
a cover side wall portion which is erected upward from an outer end of the cover bottom portion; and
a rectangular closed cross section is formed by the extending portion and the under cover.

* * * * *